Jan. 30, 1968

W. G. JEAKLE 3,365,983

DIFFERENTIAL MECHANISM

Filed June 11, 1965

Inventor:
William G. Jeakle

United States Patent Office 3,365,983
Patented Jan. 30, 1968

3,365,983
DIFFERENTIAL MECHANISM
William G. Jeakle, Auburn, Ind., assignor to Borg-Warner Corporation, Chicago, Ill., a corporation of Illinois
Filed June 11, 1965, Ser. No. 463,183
13 Claims. (Cl. 74—711)

ABSTRACT OF THE DISCLOSURE

A differential mechanism including at least one conical clutch member associated with a conical seal surface formed in the differential casing. The mechanism casing includes at least one lubricant groove extending laterally across the drum surface, which groove includes a surface extending parallel to the longitudinal axis of the mechanism. Lubricant flowing laterally through the groove is allowed to move in an axial direction from the center area of the mechanism without the additional requirement that it move in a path parallel to the drum seat surface.

---

This invention relates to limited-slip differential mechanisms which are adapted to provide a predetermined resistance to differential action. More particularly, it relates to limited-slip differential mechanisms which utilize conically shaped friction developing clutches to resist differentiation.

Limited-slip differential mechanisms are commonly used in the transmission of rotational effort to coaxially aligned, relatively rotatable shafts, such as those found in the driving axle of an automotive vehicle. These mechanisms, as do conventional differentials, allow for relative rotation between shafts when necessary, such as, for example, when the vehicle is cornering. In addition, however, they resist free differential action to insure the transmission of at least a minimum rotational effort to both output shafts. This is desirable under certain conditions, as when one wheel of a vehicle loses traction.

To effect restrained differentiation, these mechanisms usually include friction developing means such as a clutch which provides a direct driving connection between the output shafts and the differential case. In certain of these mechanisms, the clutches include conically shaped members connected to the output shafts which are axially movable into frictional engagement with complementary conical surfaces formed within the differential case. Means may be provided to maintain a predetermined minimal bias upon the clutch members to insure continuous engagement of the cone surfaces. This insures a predetermined minimum resistance to differentiation. Additionally, the mechanism is arranged so as to increase the clutch engaging force as the torque input to the differential mechanism increases.

Differential action, by definition, causes relative movement of one output shaft with respect to the differential case and as the clutch members are interposed between the shafts and the case, a corresponding slippage or relative movement of the clutch members occurs.

Relative movement of these clutch members, of necessity, results in wear of the members and, under certain circumstances, excessive wear or damage to the clutch contacting surfaces has been encountered. For this reason, it is imperative that adequate lubrication of the clutches be provided to insure satisfactory operation and extended durability life.

Accordingly, it is the principal object of the present invention to provide an improved form of limited-slip differential mechanism.

It is another object of the present invention to provide an improved casing for limited-slip differential mechanisms.

It is a further object of the present invention to provide an improved form of limited-slip differential mechanism utilizing cone shaped clutches to resist differentiation wherein improved lubrication facilities for the relatively rotating clutch surfaces are provided.

It is still a further object of the present invention to provide an improved form of limited-slip differential mechanism utilizing cone shaped clutches to resist differentiation wherein improved lubrication paths extending transversely of the clutch contacting surfaces are provided which allow flow of lubricant in a direction generally parallel to the longitudinal axis of the mechanism output shafts.

It is another object of the present invention to provide an improved form of limited-slip differential mechanism in which cone shaped clutches are used to resist differentiation wherein a combination of lubricant paths is provided along the opposing clutch contacting surfaces which direct lubricant flow transversely of the clutch member in a direction generally parallel to the axis of the output shafts and also helically about the contacting surfaces.

These and other objects of the present invention will become apparent with reference to the following description and accompanying drawing.

Very generally, the present invention is directed to an improved form of limited-slip differential mechanism which includes improved lubrication facilities for the relatively movable frictionally engaged surfaces of the differentiation resisting clutch components. Lubrication paths are provided which extend transversely of the clutch conical surfaces which allow flow of lubricant in a direction generally parallel to the longitudinal axis of the output shafts. Further, lubrication facilities of this type may be used in cooperation with lubricant paths extending helically about one of the clutch contacting surfaces to supply lubricant to clutch components during differentiation.

Figure 1:
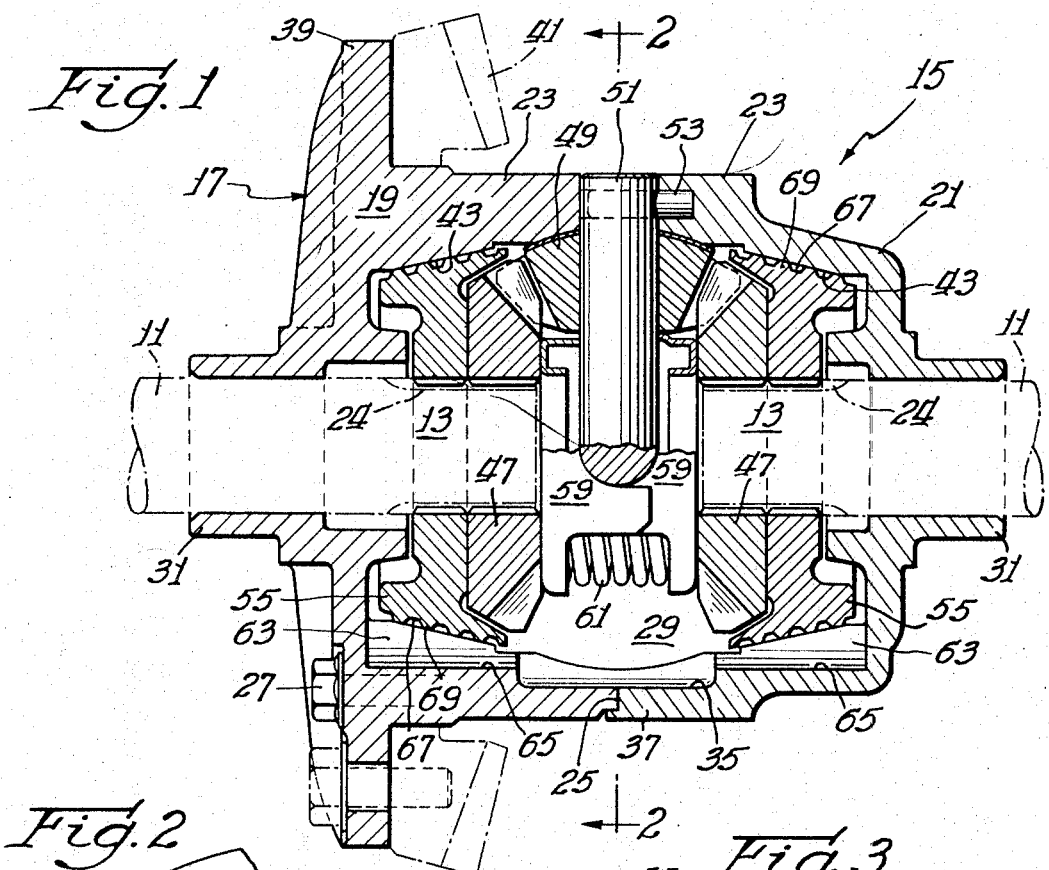
FIGURE 1 is a revolved sectional view of a differential mechanism taken substantially along line 1—1 of FIGURE 2 and illustrating various of the features of the present invention.
Figure 2:
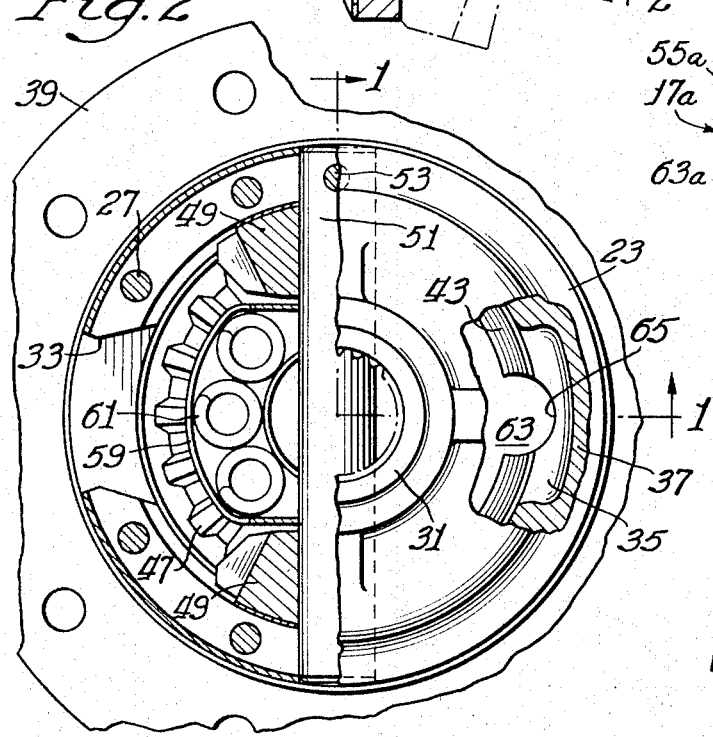
FIGURE 2 is a fragmentary view, partially in section, of the apparatus of FIGURE 1 taken substantially along line 2—2 of FIGURE 1.

Referring specifically to an embodiment of the invention illustrated in FIGURES 1 and 2, there is shown a pair of coaxially disposed, relatively rotatable output shafts 11 which are adapted to transmit rotational effort to load receiving members (not shown), such as the driving wheels of an automotive vehicle. These shafts include adjacent inner splined ends 13 which are disposed in spaced apart juxtaposed relation.

A differential mechanism including a differential casing 17 is interposed between the shafts 11 in overlying relation to the splined ends 13 and is adapted to transmit rotational effort to the shafts while allowing relative rotational movement between them when necessary.

The casing 17 is formed by a pair of cooperating, generally cup-shaped sections comprising a flange section 19 and a cap section 21 which include generally cylindrical wall portions 23 disposed in abutting relation along a parting line 25. These sections are retained in abutting relation as by bolts 27 with the exterior surface of the walls defining a portion of the exterior of the casing and interior surface of the walls defining a cavity 29 surrounding each of the output shafts 11.

Each of the sections 19 and 21 include a shaft opening defined by a longitudinally elongated hub 31 centrally disposed in the transverse end of that section which receives the respective shaft 11.

A side port 33 (FIGURE 2) formed by laterally mating rectangular openings in each of the casing sections at their abutting ends extends through the casing wall to allow oil or other lubricant to enter the interior of the cavity 29. In addition, at least one lubricant pocket 35 is provided on the interior of the cavity formed by the casing walls to provide a reservoir to collect quantities of lubricant during rotation of the casing. These pockets are formed by laterally mating depressions in the interior of the casing section at the abutting ends of the sections which extend partially through the wall 23 toward the exterior of the casing where they are closed by a web 37.

It should be understood that the number of side ports 33 and lubricant pockets 37 provided in the differential mechanism shown are merely illustrative and may be varied without departing from the scope of the invention.

The flange section 19 of the casing 17 includes a radially directed flange 39 extending about its exterior periphery to which is secured a ring gear 41 shown in phantom lines which is adapted to receive rotational effort from an associated drive line system (not shown) for transmission to the output shafts 11.

Each of the sections 17 and 19 are further provided with a generally frusto-conical shaped surface within the cavity 29 forming a pair of spaced apart truncated cone-shaped drums 43 concentrically disposed with respect to the longitudinal centerline of the shafts 11. The drums are formed such that the conical surfaces converge toward the hubs 31 of the respective section within which they are formed, that is, axially away from the parting line 25.

To effect transmission of rotational effort to the output shafts 11 while allowing for relative rotational movement between shafts, a bevel gear system is provided within the differential casing 17.

The bevel gear system includes a pair of side gears 47 each of which is connected to one of the ends 13 of the shafts 11 to transmit rotational effort thereto. The gears include splined inner bores which receive splines 24 of the shafts 11. The gears, therefore, are axially movable with respect to the shafts, and are rotatable therewith.

The bevel gear system further includes a pair of pinion gears 49 rotatably supported by a transversely extending pinion shaft 51. These gears are spaced equidistant from the longitudinal centerline of the output shafts 11 in intermeshing engagement with the side gears 47. The pinion shaft 51 extends transversely of the differential casing 17 between the side gears 47. The shaft is secured to the casing sections as by a dowel pin 53 and is therefore rotatable therewith.

It is preferred that the teeth of the pinion gears and side gears be of a configuration such that transmission of torque from the housing, pinion shaft, and pinion gears to the side gears results in a substantial axial force component parallel to the output shafts tending to separate the side gears. The purpose of this relationship will become apparent shortly.

When rotational effort is received by the differential casing 17 from the drive line system (not shown) the casing is caused to rotate about the longitudinal centerline of the output shafts 11. Such action causes the pinion shaft 51 to revolve in a plane perpendicular to the output shaft centerline causing the pinion gears 49 to traverse a circular path about the output shafts. As the pinion gears 49 are interconnected with the side gears 47, rotational movement of the pinion gears with respect to the output shafts in turn causes the side gears to rotate about the axis of the output shafts. This rotation is transmitted through the splined ends 13 of the output shafts to the load receiving members.

When differential action is required, as when a vehicle is cornering or when any other condition exists wherein one driving wheel is required to make a greater number of revolutions than the other, the pinion gears not only revolve about the output shafts 11 but also rotate upon the pinion shaft 51 allowing relative movement between side gears and, consequently, relative rotation between shafts 11.

Under certain circumstances, the ability of the differential mechanism to provide for relative rotation between output shafts is a disadvantage rather than an advantage. For example, when one driving wheel of a vehicle is on slippery pavement and the other is on dry pavement, free differential action prevents the transmission of rotational effort to the wheel having the traction. The side gear associated with the wheel having the traction would remain stationary and the pinion gears would revolve about it in their circular path about the output shafts and simultaneously rotate about the pinion shaft 51 resulting in rotation of only the wheel without traction. To overcome this inherent operational characteristic, the differential mechanism 15 of the illustrated embodiment is provided with means for resisting differential action to the extent that an initial predetermined minimum rotational effort will be applied to the wheel having the greater traction and to the extent that an additional cumulative rotational effort will be applied to the wheel having the greater traction as a function of input torque to the differential mechanism.

As best seen in FIGURE 1, there is provided within the cavity 29 a pair of truncated cone shaped clutch members 55 disposed for frictional engagement with the conically shaped drums 43 formed on the interior of the differential casing 17. Each of the cone shaped clutch members 55 is provided with a splined inner bore which engages the splined end 13 of one of the output shafts 11 so that the clutch member 55 is both rotatable with the shaft and axially movable thereon.

The clutch members 55 are spaced laterally outwardly from the transversely extending pinion shaft 51 with the side gears 47 of each shaft positioned intermediate the shaft 51 and the clutch member 55. The clutch member 55 and side gear 47, associated with each shaft, are in transverse abutting contact so that axial movement of one of the members in a direction toward the other member effects a corresponding axial movement of that member.

It should be appreciated that though the side gears and clutch members are depicted as separate elements, they may readily be formed of a single component without in any way departing from the scope of the present invention.

As the clutch members are splined to their respective output shafts 11, engagement of the cone shaped clutch members 55 with the mating drum surfaces 43 of the differential casing 17 provides a means for transmission of rotational effort directly from the differential casing to the shafts 11. Such a direct driving connection insures the transmission of a predetermined rotational effort to each of the output shafts independent of the tractive condition associated with the output shafts. In this manner, differentiation is retarded to the extent of the frictional engagement capacity of the clutch members.

Frictional engagement of the clutch members is accomplished in two ways. First, an initial preload of the clutch members into frictional driving engagement is provided by a spring pack assembly extending between the side gears 47 and overlying the transverse pinion shaft 51. The spring pack assembly includes a pair of gear contacting members 59 each of which includes a transverse face in contact with one of the side gears. The gear contacting members are urged outwardly by a plurality of compressed coil springs 61 which may be equally distributed on either side of the pinion shaft 51 to insure uniform load application upon the contacting members and consequently the side gears 47.

The outward force applied to the side gears 47 by the spring pack is, in turn, transferred to the clutch members 55 urging them into frictional engagement with the frusto-conical drums 43 of the casing 17 to provide an initial frictional driving relation between them to transmit at least a minimum rotational effort from the housing 21 directly to the output shafts 11. The number of springs used in the spring pack, and their size and spring rate may be varied to alter the preload on the clutch members to achieve the operational characteristics desired for a particular application.

In addition to the initial preload of the clutch members provided by the spring pack assembly, lateral separating forces between the pinion and side gears further contribute to the degree of frictional engagement between clutch components. As the torque input to the differential mechanism increases, the separating force upon the pinion and side gears also increases, thus increasing the axial force exerted on the clutch members by the side gears. In this manner, the clutch members are urged into further frictional engagement to provide a cumulative increase in the degree of restraint of differential action.

As explained, in certain instances, relative rotation between output shafts is necessary to accomplish certain desired results, such as when a vehicle negotiates a corner, or curve wherein one drive wheel must turn at a faster rate than the other. In these circumstances, it is necessary that the frictional engagement between the clutch members and cones be overcome so that relative movement between shafts may be effected. When this occurs, the clutch members must, of necessity, slip with respect to the drum surface to allow relative movement of one shaft with respect to the other. Additionally, when one drive wheel loses traction, the clutch members slip rapidly in opposite relative directions upon the drum surfaces. This is true even though the axial forces imparted to the clutches by the side gears are relatively great.

As can be appreciated, excessive slippage between the clutch components may cause serious damage to the contacting surfaces and may result in premature failure of the differential mechanism.

To prevent the occurrence of such adverse consequences, lubrication facilities are provided which provide the contacting surfaces of the clutch members with lubricant to reduce the coefficient of friction between the contacting surfaces and also aid in the dissipation of heat generated during differential action.

In accordance with the present invention and as seen in FIGURES 1 and 2, a laterally extending channel 63 is provided in each of the drum surfaces 43. The channel 63 is open at the drum surface, and extends axially outwardly from the lubricant pocket 35 formed in the casing wall 23. The channels intersect the lubricant pocket intermediate the web 37 and the interior surface of the wall 23 in insure free flow of lubricant from the pocket to the channel.

The channel is of generally semi-circular cross section and extends laterally across the entire drum surface. It includes a bottom surface 65 which is formed so as to extend generally parallel to the axis of the output shafts 11.

As the lubricant pocket 35 normally collects lubricant present within the cavity 29 during rotation of the differential casing 17, the channels 63 are provided with an ample supply of lubricant for distribution to the conical surfaces of the clutch components. Further, as the bottom surface 65 of the channel is parallel to the axis of the output shafts 11, no change in position relative to the axis of the output shafts is experienced by the lubricant as it progresses outwardly from the pocket 35 along the channel 63.

Though only one such laterally extending channel is shown in each drum surface, it should be appreciated that more than one may be used without departing from the scope of this invention.

The embodiment of the invention shown in FIGURES 1 and 2 further includes a helically progressing groove 67 extending about the contacting surface of each of the conical clutch members 55. The pitch or lead of the groove is such that lands 69 are formed between successive portions of the groove. These lands provide necessary surface area for contact with the drum surfaces 43 without excessive unit loading upon contact areas.

The grooves 69 are adapted to direct lubricant from the cavity 29 along the clutch contacting surfaces outwardly in a spiral progression toward the hubs 31 of the casing 17. This spiral pattern causes the lubricant to wipe the entire conical clutch drum surface 43, providing continuous movement of lubricant across the frictionally engaged contacting surfaces.

With a construction as shown in the illustrated embodiment, lubricant may progress laterally along the channels 63 to provide an ample supply for distribution along the contacting surfaces by the spirally progressing grooves 67.

Adequate lubrication is thus provided under all conditions of differential action regardless of the relative direction of rotation of output shafts 11 and extended differentiation may occur without serious wear or damage to clutch components.

Figure 3:
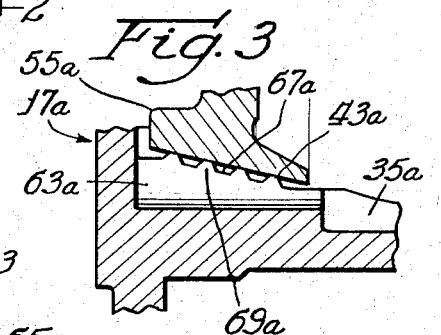
FIGURE 3 is a fragmentary sectional view on an enlarged scale showing an alternate embodiment of the invention.

Referring now to FIGURE 3, there is shown an alternate embodiment of the invention. In this construction, there is provided a laterally extending lubricant channel 63a extending across a clutch drum 43a from a lubricant pocket 35a formed in a differential casing 17a. A clutch member 55a having a smooth conical surface is disposed so as to frictionally engage the drum surface 43a to provide restrained differential action.

A spiral groove 67a is provided upon the drum surface 43a defining lands 69a between successive portions of the groove which frictionally engage the smooth surface on the conical clutch member.

In this embodiment, as in the embodiment of FIGURES 1 and 2, lubricant may readily progress along the channel 63a from the lubricant pocket 35a without experiencing a change in its relative position from the axis of the output shaft as it travels outwardly from the center of the differential case toward the outer ends of the mechanism, insuring an adequate supply of lubricant to the spiral grooves for exposure to the contacting surfaces during differentiation.

Various of the features of the invention have been particularly shown and described, however, it should be obvious to one skilled in the art that various modifications may be made therein without departing from the scope of the invention.

I claim:

1. A casing for a differential mechanism including a pair of coaxially aligned spaced apart hubs adapted to receive a pair of coaxial, relatively rotatable output shafts; means connecting said hubs and defining an internal cavity therebetween; at least one frusto-conically shaped drum surface formed on the interior of said casing within said cavity disposed coaxially of said hubs; at least one lubricant channel formed in said casing defining an opening at said drum surface and extending laterally thereacross, said channel including a surface disposed opposite said opening at said drum surface which extends laterally of said drum parallel to the axis of said hubs.

2. A casing for a differential mechanism including a pair of coaxially aligned spaced apart hubs adapted to receive a pair of coaxial relatively rotatable output shafts; means connecting said hubs and defining an internal cavity therebetween, said means including a wall having an exterior surface defining at least a portion of the exterior of said casing and an interior surface defining at least a portion of said cavity; a lubricant pocket formed in said wall open to said cavity and closed at the exterior of said wall by a web, at least one frusto-conically shaped drum surface formed on the interior of said wall disposed coaxially of said hubs and laterally adjacent said lubricant pocket; a lubricant channel formed in said wall defining an opening at said drum surface extending laterally thereof and including a surface disposed opposite said opening at said drum surface which extends laterally thereof parallel to the axis of said hubs, said channel communicating with said lubricant pocket intermediate said web and the interior surface of said wall.

3. A casing for a differential mechanism including a pair of coaxially aligned spaced apart hubs adapted to receive a pair of coaxial, relatively rotatable output shafts; means connecting said hubs and defining an internal cavity therebetween; at least one conically shaped drum surface formed on the interior of said casing within said cavity disposed coaxially of said hubs, said drum surface including a spirally progressing groove defining lands intermediate successive portions thereof forming said conical surface; a lubricant channel formed in said casing defining an opening at said drum surface and intersecting said spirally progressing groove, said channel including a surface disposed opposite said opening at said drum surface which extends laterally of said drum parallel to the axis of said hubs.

4. A casing for a differential mechanism including a pair of coaxially aligned spaced apart hubs adapted to receive a pair of coaxial, relatively rotatable output shafts; means connecting said hubs and defining an internal cavity therebetween; a pair of frusto-conically shaped drum surfaces formed on the interior of said casing within said cavity disposed coaxially of said hubs; a lubricant channel formed in each of said drum surfaces extending laterally thereacross and defining an opening at each said surface, each said lubricant channel including a surface disposed opposite each said opening at said drum surface which extends laterally of said drum parallel to the axis of said hubs.

5. A casing for a differential mechanism including a pair of coaxially aligned spaced apart hubs adapted to receive a pair of coaxial, relatively rotatable output shafts; means connecting said hubs and defining an internal cavity therebetween, said means including a wall having an exterior surface defining at least a portion of the exterior of said casing and an interior surface defining at least a portion of said cavity; a lubricant pocket formed in said wall open to said cavity and closed at the exterior of said wall by web, a pair of conically shaped drum surfaces on the interior of said wall disposed coaxially of said hubs positioned on opposite sides of said lubricant pocket and diverging in a direction toward said pocket; a lubricant channel formed in each of said drums defining an opening at said drum surface and extending laterally thereacross, each said channel including a surface disposed opposite said opening at said drum surface which extends laterally thereof parallel to the axis of said hubs, said channels further communicating with said lubricant pocket intermediate said web and the interior surface of said wall.

6. A casing for a differential mechanism including a pair of coaxially aligned spaced apart hubs adapted to receive a pair of coaxial, relatively rotatable output shafts; means connecting said hubs and defining an internal cavity therebetween, said means including a wall having an exterior surface defining at least a portion of the exterior of said casing and an interior surface defining at least a portion of said cavity; a pair of frusto-conically shaped drum surfaces formed on the interior of said casing within said cavity disposed coaxially of said hubs, said drum surfaces including a spirally progressing groove defining lands intermediate successive portions thereof, said lands forming said conical surface; a lubricant channel formed in each of said drums defining an opening at said drum surface and intersecting said spirally progressing grooves, each said channel including a surface disposed opposite said opening at said drum surface which extends laterally of said drum parallel to the axis of said hubs.

7. A limited slip differential mechanism comprising a differential casing adapted to receive an input torque for transmission to a pair of coaxially aligned relatively rotatable output shafts, said casing including a pair of coaxially aligned spaced apart hubs adapted to receive the output shafts, at least one conically shaped drum surface formed on the interior of said casing, at least one conically shaped clutch member disposed within said casing and adapted to be connected to one of the output shafts, means urging said clutch member into a predetermined frictional engagement with said drum surface, a bevel gear system disposed within said casing including at least one side gear adapted to be connected to the output shafts for transmission of rotational effort thereto, said bevel gear system being adapted to apply an axial force upon said clutch member in a direction to increase said frictional engagement, means adapted to allow entry of lubricant into said casing, and at least one lubricant channel formed in said drum defining an opening extending laterally thereacross, said channel including a surface disposed opposite said opening which extends laterally of said drum surface parallel to the longitudinal axis of said hubs.

8. A limited slip differential mechanism comprising a differential casing adapted to receive an input torque for transmission to a pair of coaxially aligned relatively rotatable output shafts, said casing including a pair of coaxially aligned spaced apart hubs adapted to receive the output shafts, at least one conically shaped drum surface formed on the interior of said casing, at least one conically shaped clutch member disposed within said casing and adapted to be connected to one of the output shafts, means urging said clutch member into a predetermined frictional engagement with said drum surface, a bevel gear system disposed within said casing including at least one side gear and adapted to be connected to the output shafts for transmission of rotational effort thereto, said bevel bear system being adapted to apply an axial force upon said clutch member in a direction to increase said frictional engagement, means adapted to allow entry of lubricant into said casing, at least one lubricant channel formed in said drum defining an opening extending laterally thereacross, said channel including a surface disposed opposite said opening which extends laterally of said drum surface parallel to the longitudinal axis of said hubs, and a spirally progressing groove formed in one of said drum and conically shaped clutch members defining a series of lands between adjacent portions thereof, said lands forming said conical surface for contacting the other one of said drum and clutch members.

9. A limited slip differential mechanism comprising a differential casing adapted to receive an input torque for transmission to a pair of coaxially aligned relatively rotatable output shafts, said casing including pair of coaxially aligned spaced apart hubs adapted to receive the output shafts, at least one conically shaped drum surface formed on the interior of said casing, said drum surface including a spirally progressing groove defining lands intermediate successive portions thereof, said lands forming said conical surface, at least one conically shaped clutch member disposed within said casing and adapted to be connected to one of the output shafts, means urging said clutch member into a predetermined frictional engagement with said drum surface, a bevel gear system disposed within said casing including at least one side gear adapted to be connected to the output shafts for transmission of rotational effort thereto, said bevel gear system being adapted to apply an axial force upon said clutch member in a direction to increase said frictional engagement, means adapted to allow entry of lubricant into said casing, and a lubricant channel formed in said drum defining an opening extending laterally thereacross, intersecting said spirally progressing groove, said channel including a surface disposed opposite said opening which extends laterally of said drum surface parallel to the longitudinal axis of said hubs.

10. A limited slip differential mechanism comprising a differential casing adapted to receive an input torque for transmission to a pair of coaxially aligned relatively rotatable output shafts, said casing including a pair of coaxially aligned spaced apart hubs adapted to receive the output shafts, at least one conically shaped drum surface formed on the interior of said casing, at least one conically shaped clutch member disposed within said casing and adapted to be connected to one of the output shafts, said clutch member including a spirally progressing groove defining lands intermediate successive portions thereof, said lands forming said conical surface, means urging said clutch member into a predetermined frictional engagement with said drum surface, a bevel gear system disposed within said casing including at least one side gear adapted to be connected to the output shafts for transmission of rotational effort thereto, said bevel gear system being adapted to apply an axial force upon said clutch member in a direction to increase said frictional engagement, means adapted to allow entry of lubricant into said casing, and a lubricant channel formed in said drum defining an opening extending laterally thereacross, said channel including a surface disposed opposite said opening which extends laterally of said drum surface parallel to the longitudinal axis of said hubs.

11. A limited slip differential mechanism comprising a hollow differential casing adapted to receive an input torque for transmission to a pair of coaxially aligned relatively rotatable output shafts, said casing including a pair of coaxially aligned spaced apart hubs adapted to receive the output shafts, at least one conically shaped drum surface formed on the interior of said casing, at least one conically shaped clutch member disposed within said casing and adapted to be connected to one of the output shafts, means urging said clutch member into a predetermined frictional engagement with said drum surface, a bevel gear system disposed within said casing including at least one side gear adapted to be connected to the output shafts for transmission of rotational effort thereto, said bevel gear system being adapted to apply an axial force upon said clutch member in a direction to increase said frictional engagement, means adapted to allow entry of lubricant into said casing, a lubricant pocket open to the interior of said casing disposed laterally adjacent said drum surface, said pocket being closed at the exterior of said casing by a web to prevent the escape of lubricant therefrom, and a lubricant channel formed in said drum defining an opening extending laterally thereacross, said channel including a surface disposed opposite said opening which extends laterally of said drum surface parallel to the longitudinal axis of said hubs, said channel intersecting said lubricant pocket intermediate said web and said interior of said casing.

12. A limited slip differential mechanism comprising a differential casing adapted to receive an input torque for transmission to a pair of coaxially aligned relatively rotatable output shafts, said casing including a pair of coaxially aligned spaced apart hubs adapted to receive the output shafts, a pair of conically shaped drum surfaces formed on the interior of said casing, a pair of frustoconically shaped clutch members disposed within said casing, each said member being adapted to be connected to one of the output shafts, means urging each said clutch member into a predetermined frictional engagement with one of said drum surfaces, a bevel gear system disposed within said casing including at least one side gear adapted to be connected to the output shafts for transmission of rotational effort thereto, said bevel gear system being adapted to apply an axial force upon said clutch members in a direction to increase said frictional engagement, means adapted to allow entry of lubricant into said casing, and at least one lubricant channel formed in each of said drum surfaces defining an opening at said drum surface extending laterally thereacross, each said channel including a surface disposed opposite said opening which extends laterally of said drum surface parallel to the longitudinal axis of said hubs.

13. A limited slip differential mechanism comprising a differential casing adapted to receive an input torque for transmission to a pair of coaxially aligned relatively rotatable output shafts, said casing including a pair of coaxially aligned spaced apart hubs adapted to receive the output shafts, a pair of conically shaped drum surfaces formed on the interior of said casing, a pair of frustoconically shaped clutch members disposed within said casing, each said member being adapted to be connected to one of the output shafts, means urging each said clutch member into a predetermined frictional engagement with one of said drum surfaces, a bevel gear system disposed within said casing including at least one side gear adapted to be connected to the output shafts for transmission of rotational effort thereto, said bevel gear system being adapted to apply an axial force upon said clutch members in a direction to increase said frictional engagement, means adapted to allow entry of lubricant into said casing, a lubricant pocket open to the interior of said casing disposed intermediate said drum surfaces, said pocket being closed at the exterior of said casings by a web to prevent the escape of lubricant therefrom, and at least one lubricant channel formed in each of said drum surfaces defining an opening at said drum surface extending laterally thereacross, each said channel including a surface disposed opposite said opening which extends laterally of said drum surface parallel to the longitudinal axis of said hubs, said channels intersecting said lubricant pocket intermediate web and said interior of said casing.

References Cited
UNITED STATES PATENTS

| | | | |
|---|---|---|---|
| 2,821,096 | 1/1958 | Lyeth Jr. | 74—711 |
| 2,965,205 | 12/1960 | Winchell | 192—66 |

FOREIGN PATENTS

| | | |
|---|---|---|
| 113,325 | 6/1941 | Australia. |
| 644,495 | 7/1962 | Canada. |
| 883,988 | 7/1953 | Germany. |
| 248,292 | 1/1948 | Switzerland. |

FRED C. MATTERN, JR., *Primary Examiner.*

J. A. WONG, *Assistant Examiner.*